Patented Oct. 2, 1923.

1,469,322

UNITED STATES PATENT OFFICE.

OSWELL W. LILLY, OF WELCH, WEST VIRGINIA, ASSIGNOR TO LILLY DENTAL PRODUCTS COMPANY, OF WELCH, WEST VIRGINIA, A CORPORATION OF WEST VIRGINIA.

COMPOUND FOR TREATING VINCENT'S STOMATITIS.

No Drawing. Application filed April 12, 1922. Serial No. 551,940.

*To all whom it may concern:*

Be it known that I, DR. OSWELL W. LILLY, a citizen of the United States, residing at Welch, in the county of McDowell and State of West Virginia, have invented certain new and useful Improvements in Compounds for Treating Vincent's Stomatitis, of which the following is a specification.

This invention relates to remedies for treating dental diseases, and particularly to a compound for the treatment of Vincent's stomatitis, also known as Vincent's gingivitis, trench mouth, phagedenic gingivitis, and Vincent's angine.

The object of the invention is to provide a compound of this character which will have a special action upon and a selective affinity for the particular kind of microorganisms present in and known to be the active causative agent of this disease.

Heretofore remedies for this disease have generally been of that type classed as antiseptics or germicides, such as, for instance, iodine (Churchhill's solution) nitrate of silver, peroxide of hydrogen, and sodium hyperborate. While these agents were of merit and had antiseptic and germicidal qualities, their use in practice has not given definite results and they cannot be classed as specifics for the disease before referred to.

It has been found by experiment and practice that a compound containing some form of arsenic possesses most of the qualifications requisite to the successful treatment of this disease. Salvarsan and neosalvarsan were used and recommended for this disease, but not only is the cost prohibitive but it has been found that salvarsan and neo-salvarsan are of value only in freshly made solutions and that old solutions become unfit for use, toxic and dangerous, thereby making its use as a mouth wash and lotion impracticable.

In the preparation of my compound I use arsenic trioxide ($AS_2O_3$) as the form of arsenic best fitted for use, and the compound is formed of arsenic trioxide 1%, red mercuric iodide ($HgI_2$) 1%, potassium iodide (KI) 4%, water, and glycerin. The water and glycerin act as the solvents, the glycerine being used on account of its hygroscopic property and to facilitate the application of the remedy. A coloring agent is preferably added in order to suggest the poisonous nature of the compound and make the compound readily distinguishable. Tincture of cudbear is preferably the agent used and this is used in sufficient quantity to make the solution a cherry red in color.

The arsenous trioxide is used in the compound on account of its specific action upon the Vincent's spyrochatæ, a germ which is always found in Vincent's stomatitis. The red mercuric iodide is used for its specific action on the fusiform bacillæ which is also always present in this disease. The potassium iodide is used as an antiseptic and a tissue stimulant to promote the absorption of the toxins of this disease.

It is to be understood that my compound does not contain the double salt of mercuric potassium iodide. The potassium iodide concentration in my solution is not sufficient to produce the double salt, but the potassium iodide simply acts as a catalytic agent, enabling me to bring the mercuric iodide in solution. Therefore, my compound contains arsenic trioxide, potassium iodide, and mercuric iodide suspended in solution without chemical reaction between the ingredients.

In actual practice it has been found that this solution as above made possesses all of the qualifications requisite for a specific remedy for Vincent's stomatitis. It will be seen that my compound contains no free iodine at all and that my compound is not a general antiseptic but is a specific for a certain, well defined disease and adapted to be used also for syphilitic sores of the mouth and certain cases of pyorrhea.

While I have stated certain proportions of these drugs, which proportions are preferable, I do not wish to be limited to these proportions, as they may be changed within a certain range without departing from the spirit of the invention. Thus, for instance, I may use arsenic trioxide from $\frac{1}{4}$% to 1%, red mercuric iodide $\frac{1}{4}$% to 1%, and the potassium iodide from 1% to 8%. The water and glycerine can be used in any varied proportion desired and the glycerine may be omitted entirely but is preferably used for the reasons previously stated. It is to be understood that distilled water only is to be used. None of the ingredients, with the exception of the glycerine, can be omitted without lessening the efficiency of the compound. Each of these ingredients might be used separately with some benefit, but the combined effect of all three of the medicinal agents is necessary to obtain the desired effect. No chemical reaction is believed to take place in the compounding of this remedy and thus the medicinal value of each of the ingredients is secured.

While mercuric succinimide possibly could be substituted for the red mercuric iodide, and sodium iodide or other alkaline haloid could be substituted for the potassium iodide, yet neither of these I regard as being as efficient for the purpose as red mercuric iodide and potassium iodide. No other preparation of arsenic known to me can take the place of the arsenic trioxide.

In the compounding of this remedy, the arsenic trioxide is first dissolved separately to form a concentrated solution in boiling distilled water. The potassium iodide is also dissolved separately in distilled water, and the red mercuric iodide is then added to the solution of potassium iodide. The two solutions are then mixed together and diluted to the desired strength by distilled water and glycerine. The red iodide of mercury is insoluble in either water or glycerine but is soluble in the presence of potassium iodide. therefore, the red mercuric iodide could not be used in this remedy were it not used in conjunction with the potassium iodide. Thus the potassium iodide not only has its proper medicinal value in the compound but also serves as a catalytic means whereby the red iodide of mercury is brought in solution. It may be remarked that in the bringing of the arsenic trioxide into a solution, potassium bicarbonate can also be added to the arsenic trioxide to an amount equal to the arsenic trioxide. Rose water or spirits of lavender or other flavoring material can be added to the compound but simply for flavoring purposes.

The compound is used in the treatment of Vincent's stomatitis by applying the solution to the gums and affected surfaces. To do this, the affected surface should be dried as thoroughly as possible by means of absorbent cotton and the solution applied freely to the affected surface by means of cotton pellets. As a mouth wash, one teaspoonful of the solution to one-third glass of water should be used four times daily, after meals and at night.

I claim:—

1. A compound for the treatment of gingivitis consisting of arsenic trioxide 1%, red mercuric iodide 1%, potassium iodide 4%, and a solvent.

2. A compound for the treatment of gingivitis consisting of arsenic trioxide 1%, red mercuric iodide 1%, potassium iodide 4%, water, and glycerine.

3. A compound for the treatment of gingivitis consisting of arsenic trioxide from $\frac{1}{4}$% to 1%, a mercuric salt from $\frac{1}{4}$% to 1%, an alkaline haloid from 1% to 8%, and water.

4. A compound for the treatment of gingivitis consisting of arsenic trioxide from $\frac{1}{4}$% to 1%, a mercuric salt from $\frac{1}{4}$% to 1%, a salt of iodine from 1% to 8%, and water.

In testimony whereof I hereunto affix my signature.

OSWELL W. LILLY.